G. N. WOLF.
CREAM SEPARATOR.
APPLICATION FILED MAR. 23, 1909.
935,183.
Patented Sept. 28, 1909.
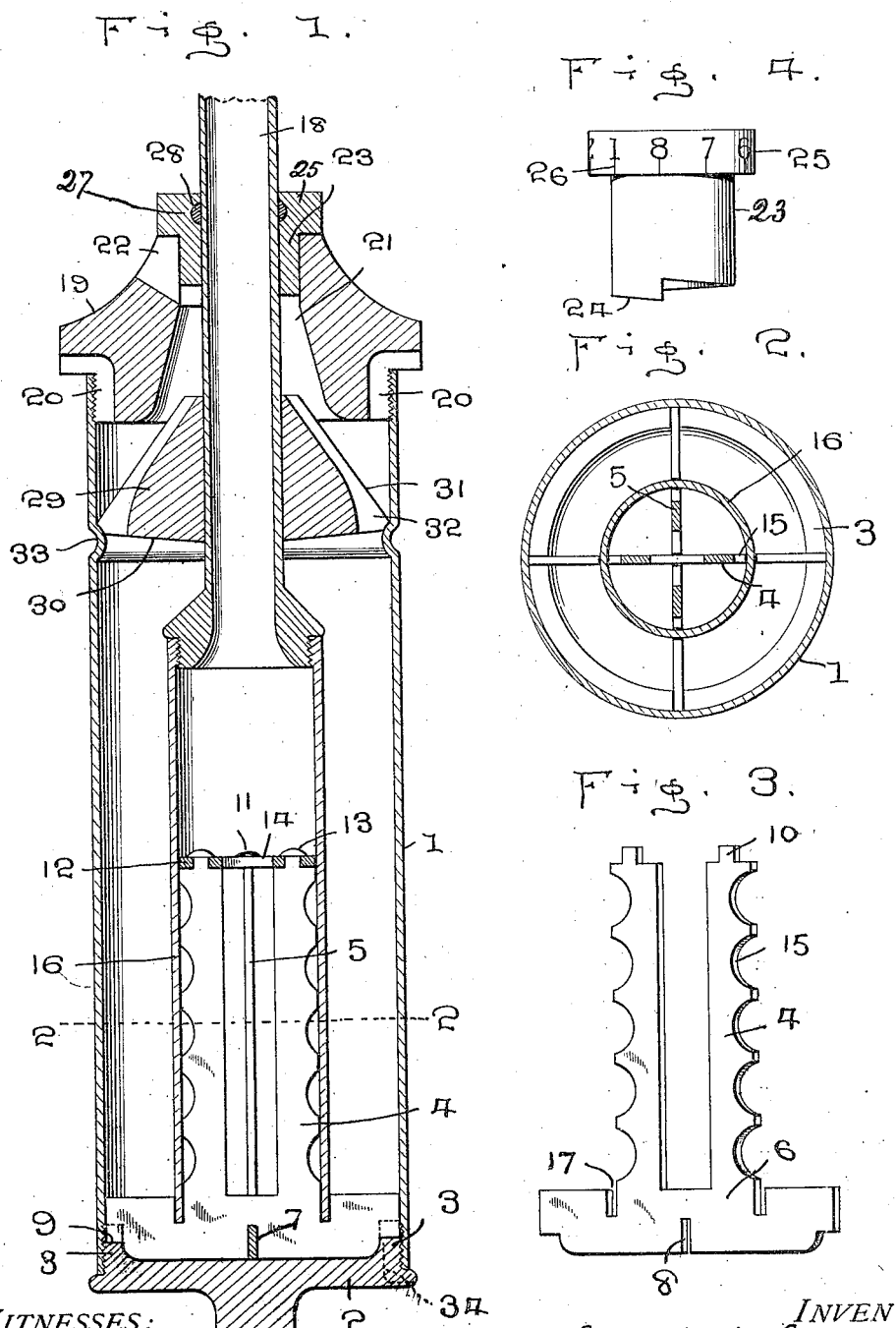
WITNESSES:
Thos. W. Riley
M. A. Newcomb
INVENTOR
G. N. Wolf
BY W. J. FitzGerald
Attorneys

UNITED STATES PATENT OFFICE.

GEORGE N. WOLF, OF ANDERSON, INDIANA.

CREAM-SEPARATOR.

935,183.  
Specification of Letters Patent. Patented Sept. 28, 1909.

Application filed March 23, 1909. Serial No. 485,247.

*To all whom it may concern:*

Be it known that I, GEORGE N. WOLF, a citizen of the United States, residing at Anderson, in the county of Madison and State of Indiana, have invented certain new and useful sanitary Improvements in Cream-Separators; and I do hereby declare the following to be a full, clear, and exact description of the invention, such as will enable others skilled in the art to which it appertains to make and use the same.

My invention relates to new and useful improvements in sanitary cream separators, and has for its object to provide a device of this type which will thoroughly separate the cream from the milk by centrifugal action.

A further object of the invention is to provide suitable beaters to agitate the milk and cream as it is emptied into the separator. And a still further object is to so construct the ports through which the milk and cream are discharged from the separator, that said ports shall be readily accessible for cleaning; and a still further object is to provide means for regulating the size of the ports through which the milk is discharged.

Other objects and advantages of the invention will be hereinafter disclosed, and particularly defined by the claims.

Referring to the drawings forming a part of this application, Figure 1 is a vertical transverse sectional view through the separator. Fig. 2 is a horizontal sectional view as seen on line 2—2, Fig. 1. Fig. 3 is a detailed perspective view of portions of beaters or agitators, and Fig. 4 is an elevation of the device employed for regulating the discharge opening for the cream.

Referring to the drawings in which reference characters designate corresponding parts throughout the several views, 1 indicates the body of the separator, which is preferably cylindrical and provided with a closure 2 at its lower end, said closure having a circumferential rib 3, which is exteriorly threaded and adapted to engage the threaded interior of the lower end of the body 1.

Adapted to rest on the closure 2, are beaters or agitators 4 and 5, said beaters being preferably arranged in pairs and secured together at their lower ends by means of cross arms 6 and 7, respectively, the cross arm 6 having a notch 8 adjacent to its longitudinal center, into which extends the cross arm 7, thereby interlocking said cross arm, the ends of said cross arm engaging seats 9, in the rib 3, thereby causing said beaters to rotate with the body 1.

The upper ends of the beaters 4 and 5 are provided with stems 10 and 11, respectively, which are adapted to extend through a plate 12, the upper ends of said stems being then upset to form heads 13, and by which means the plate is locked in position on the beaters. The central portion of the plate 12 is provided with an opening 14, through which the milk passes on its way to the lower end of the body 1, while the outer edges of the beaters are provided with a plurality of curved recesses 15, which permit of the circulation of the milk between the beaters and a casing 16, surrounding said beaters, the lower end of the casing entering channels 17 formed in the upper edges of the cross arms 6 and 7, while the upper end thereof extends a distance above the upper end of the beaters, and is connected to a duct 18, through which the milk is entered into the body 1.

The upper end of the body 1 is provided with a cap 19, the lower end of which is exteriorly threaded to engage threads on the interior of the body, said cap being provided with ports 20, which ports are formed by cutting channels into the edge of the cap, so that when the cap is removed from the body, the ports will be open their full length and be readily accessible for cleaning.

The central portion of the cap is provided with a substantially conical opening 21, through which the duck 18 extends, the diameter of the opening being greater than the diameter of the duct, whereby the cream when separated from the milk, will pass into said opening and through a port 22 extending through the wall of the cap, and in order to regulate the flow of the cream through the port 22, a collar 23 is introduced into the upper end of the opening 21, and around the duct 18, the lower end 24 being substantially spiral, while the upper end thereof is provided with a circular head 25. Said head is adapted to extend over the upper end of the cap 19, and by forming the collar of proper length, the flow of the cream through the port 22 may be readily regulated by rotating the collar, the position to which the collar is to be turned to obtain a certain flow, being gaged by providing indicative lines 26 on the outer face of the head, a coöperating zero point, (not shown,) being formed on the cap. The rotating of the collar in one direction, in consequence of the inclination of the lower end thereof, gradually closes the inner end of the port 22, while rotating the collar in the opposite direction will gradually increase the opening in the port.

Any suitable form of means may be provided for preventing the leakage of the milk and cream around the duct 18, but in this instance, the wall of the opening through the collar 23 is provided with a channel 27, in which is seated a gasket 28 of rubber or other expansible material, said gasket engaging the surface of the duct with sufficient pressure to prevent leakage between the duct and collar.

Positioned below the cap 19, and surrounding the duct 18, is a corrugated cone or spreader 29, the base 30 of which is slightly upwardly inclined from its center so that when the milk and cream engage the base, the same will readily pass toward the outer edge of the cone or spreader, and in order to permit the milk and cream to pass upwardly, and through their respective ports, the periphery of the spreader or cone is provided with a plurality of ribs 31, thereby forming grooves 32, through which the cream and milk may pass, the lower end of the cone engaging a circumferential shoulder 33 formed by swaging inwardly parts of the wall of the body, said shoulder limiting the downward movement of the spreader.

In addition to the ports 20 for the discharge of the milk at the upper end of the body 1, the closure 2 may be also provided with ports 34, as shown by dotted lines in Fig. 1, by which construction the separator will be provided with a top or bottom delivery for the milk, as occasion may require.

In operation, the milk and cream are introduced into the duct 18, and enter the casing 16, and as the casing and body are rapidly rotating, will be violently agitated by the beaters 4 and 5, giving the same a swirling movement in view of the space between the beaters and the recesses at the edges of the beaters adjacent to the casing. The milk and cream then pass below the lower end of the casing, where the same are engaged and further agitated by the cross arms 6 and 7. The particles of milk and cream enter the body 1 and are raised by centrifugal action to the upper end of said body and as the cream is lighter than the milk, it passes toward the center of the body, while the milk remains adjacent to the outer edge of the body. As the particles encounter the spreader or cone 29, they again pass into more or less commingled relationship with each other, until they enter the grooves 32, when, in view of the taper of the spreader, the cream-particles will abruptly leave the milk and pass upwardly into the opening 22, while the milk will adhere to the walls of the body 1 and pass out through the ports 20. In assembling the several parts, the beaters are placed in position on the closure 2, and the casing 16 is then introduced around the beaters, after which the spreader or cone 29 is introduced over the upper end of the duct 18, and suitably seated on the shoulder 33, when the cap 19 is placed in position and screwed into the upper end of the body and the collar 23 introduced around the duct 18, and properly seated upon the cap.

By this construction, it will be readily seen that all of the parts can be separated and thoroughly cleaned, the various ports being so constructed as to be readily accessible for cleaning the same, and if desired, the closure 2 may be removed from the body for cleaning.

What I claim is:

1. A cream separator, comprising a tubular body having a closure at one end, the upper face of which is provided with a rib having seats therein, a plurality of beaters having interlocking cross arms at their lower ends and a plate at their upper ends, a casing surrounding said beaters, a duct communicating with said casing, a spreader adjacent to the upper end of the body, supporting means for the spreader, a cap engaging the upper end of the body having ports therein, and a collar having means at its lower end adapted to coöperate with one of said ports to increase or decrease the discharging capacity of said port.

2. A cream separator, comprising a tubular body, a closure for the lower end of said body, beaters arranged in pairs having recesses at their outer edges, means to interlock said beaters with the closure, a casing surrounding the beaters, a duct communicating with said casing, a spreader adjacent to the upper end of the casing, a cap adapted to enter the upper end of the body, and having a tapered opening at its central portion and ports therein, a collar, the lower end of which is spiral and adapted to coöperate with one of the ports in the cap to regulate the flow of particles through the ports, and means to prevent leakage between said collar and duct.

3. In a cream separator, the combination with a cylindrical body and a closure for the lower end of said body, said closure having a circumferential rib with seats therein; of beaters arranged in pairs, said beaters having crossed arms at their lower ends adapted to engage the seats in the ribs, said crossed arms being interlocked, a collar at the upper ends of the beaters, a tube surrounding said beaters, a duct communicating with said casing, a cap having ports therein, and a collar having a spirally arranged lower end adapted to coöperate with one of the ports and regulate the discharge of the particles through said port.

In testimony whereof I have signed my name to this specification in the presence of two subscribing witnesses.

GEORGE N. WOLF.

Witnesses:
 JESSE E. BRONNENBERG,
 BERNARD VERMILLION.